United States Patent
Sun et al.

(10) Patent No.: US 10,045,239 B2
(45) Date of Patent: Aug. 7, 2018

(54) METHOD AND SYSTEM FOR DETECTING IDLE CHANNEL IN WIRELESS COMMUNICATION SYSTEM

(71) Applicant: ZTE Corporation, Shenzhen (CN)

(72) Inventors: Bo Sun, Shenzhen (CN); Kaiying Lv, Shenzhen (CN); Li Zhang, Shenzhen (CN); Yonggang Fang, Shenzhen (CN); Kaibo Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/518,056

(22) PCT Filed: Jul. 15, 2015

(86) PCT No.: PCT/CN2015/084126
§ 371 (c)(1),
(2) Date: Apr. 10, 2017

(87) PCT Pub. No.: WO2016/054938
PCT Pub. Date: Apr. 14, 2016

(65) Prior Publication Data
US 2017/0318489 A1    Nov. 2, 2017

(30) Foreign Application Priority Data

Oct. 9, 2014    (CN) .......................... 2014 1 0529848

(51) Int. Cl.
*H04W 4/00*    (2018.01)
*H04W 24/08*    (2009.01)
(Continued)

(52) U.S. Cl.
CPC ........... *H04W 24/08* (2013.01); *H04W 24/10* (2013.01); *H04W 28/18* (2013.01); *H04W 16/02* (2013.01); *H04W 72/02* (2013.01); *H04W 72/08* (2013.01)

(58) Field of Classification Search
CPC ..... H04B 7/0617; H04W 74/00; H04W 56/00
(Continued)

(56) References Cited

U.S. PATENT DOCUMENTS

| 5,805,982 A | 9/1998 | Holsebosch |
| 6,697,626 B1 | 2/2004 | Eidson et al. |

(Continued)

FOREIGN PATENT DOCUMENTS

| CN | 1756409 A | 4/2006 |
| CN | 101651639 A | 2/2010 |

(Continued)

OTHER PUBLICATIONS

International Search Report for corresponding application No. PCT/CN2015/084126 filed on Jul. 15, 2015; dated Oct. 8, 2015.
(Continued)

*Primary Examiner* — Kiet Doan
(74) *Attorney, Agent, or Firm* — Cantor Colburn LLP

(57) ABSTRACT

A method and system for detecting an idle channel in a wireless communication system are provided. In the method for detecting the idle channel, channel measurement is performed for channels which are needed for transmitting data by means of beamforming, and a channel in an idle state is determined. The system for detecting the idle channel includes: a channel measurement module arranged to perform channel measurement for channels which are needed for transmitting data by means of beamforming, and an idle
(Continued)

channel determining module arranged to determine, according to a channel measurement result, a channel in an idle state.

12 Claims, 1 Drawing Sheet

(51) Int. Cl.
*H04W 24/10* (2009.01)
*H04W 28/18* (2009.01)
*H04W 72/02* (2009.01)
*H04W 16/02* (2009.01)
*H04W 72/08* (2009.01)

(58) Field of Classification Search
USPC ....... 370/329, 335, 230, 445, 237, 252, 254, 370/310, 447; 455/41.1, 422.1, 562.1, 455/522
See application file for complete search history.

(56) References Cited

U.S. PATENT DOCUMENTS

| | | |
|---|---|---|
| 2004/0002357 A1 | 1/2004 | Benveniste |
| 2008/0075033 A1* | 3/2008 | Shattil ................... H04B 7/026 370/328 |
| 2008/0151849 A1* | 6/2008 | Utsunomiya ..... H04W 72/0486 370/338 |

FOREIGN PATENT DOCUMENTS

| | | |
|---|---|---|
| CN | 103491642 A | 1/2014 |
| CN | 103825663 A | 5/2014 |
| WO | 2013125913 A1 | 8/2013 |

OTHER PUBLICATIONS

Extended EP Search Report dated Aug. 11, 2017 re: Application No. 15849063.1-1875 / 3206313 PCT/CN2015/084126; pp. 1-6; citing: US 2004/002357 A, U.S. Pat. No. 6,697,626 B1 and U.S. Pat. No. 5,805,982 A.

* cited by examiner

METHOD AND SYSTEM FOR DETECTING IDLE CHANNEL IN WIRELESS COMMUNICATION SYSTEM

TECHNICAL FIELD

The present disclosure relates to the field of channel detection and, more particularly, to a method and system for detecting an idle channel in a wireless communication system.

BACKGROUND

At present, in the field of wireless networks, the wireless local area network (WLAN) develops rapidly, the demand for WLAN coverage is growing, WLAN is applied more widely, and deployment density of the WLAN is also increasing rapidly.

The IEEE 802.11 technology defines a Basic Service Set (BSS) consisting of one Access Point (AP) and a plurality of Stations (STAs) associated with the AP. Multiple stations can share the same wireless channel by using a mechanism of Carrier Sense Multiple Access with collision avoidance (CSMA/CA). The working principle of the CSMA/CA is described as follows. A transmitting device first detects whether a channel is idle, and if the channel is detected to be idle, the data is transmitted after waiting for a random period of time. If a receiving station receives the frame correctly, the receiving station transmits an acknowledgment (ACK) frame to the transmitting station after waiting for a period of time. The transmitting station, upon receiving the ACK frame, determines that the data is correctly transmitted.

In the CAMA/CA technology, the station uses a physical carrier channel idle state detection technology (e.g., Clear Channel Assessment (CCA)) to detect whether the channel is idle before transmitting a radio frame. Specifically, the station detects a signal interference level of a physical carrier channel within a period of time. When the signal interference level is higher than a standard defined fixed threshold value, the state of the carrier channel is considered busy; otherwise, i.e., when the signal interference level is lower than the fixed threshold value, the status of the carrier channel is considered idle and available.

When the above CSMA/CA technology is used to detect whether the channel is idle, a fixed threshold is used for determination, and the fixed threshold cannot adaptively change along with the WLAN deployment density. As a result, stations cannot raise the probability of transmitting data even when the interference between the stations has decreased, thus affecting the spectrum utilization efficiency.

In order to solve this technical problem, a technical solution has been proposed in the related art that allows to dynamically adjust the threshold value for determining whether the channel is idle according to the signal interference level measurement result of the physical carrier channel within a certain period of time. In this solution, the station is first allowed to set a temporary signal threshold according to the interference level measurement result and the engineering experience. When the distance between the transmitting station and the receiving station is close while the distance between the transmitting station and the interfering station is far, the above temporary signal threshold is increased, thus raising the data transmission probability of the transmitting station. By virtue of this technical solution, for the overall network statistical performance, the average data transmission delay can be reduced and the average spectrum utilization rate can be improved.

With the development of the Multiple Input Multiple Output (MIMO) technology, the MIMO technology is also introduced in the current WLAN system. The MIMO technology supports the transmitting station to transmit data in a directional beamforming technique. The transmitting station can concentrate the transmitted signal energy in a small spatial range, thereby improving transmission performance and transmission distance, and causing very small interference to other stations outside the above spatial range. Since the associated WLAN divides the channel only by frequency, rather than divides the channel by space, when the relevant channel idle detection is performed in the MIMO-WLAN network, the transmitting station stops transmitting data once the channel is detected to be busy. But in fact, the transmitting station using the MIMO technology may be only interfered from other stations in a certain direction. If the transmitting station stops transmitting data in various transmitting directions, data transmission probability of the transmitting station is undoubtedly reduced.

SUMMARY

The technical problem to be solved by the present disclosure is to provide a method and system for detecting an idle channel in a wireless communication system so as to solve the technical problem about how to improve the data transmission probability of the transmitting station.

In order to solve the technical problem, the following technical solution is adopted.

A method for detecting an idle channel, applied in a wireless communication system is provided. The method for detecting the idle channel includes the following acts.

Channel measurement is performed for channels which are needed for transmitting data by means of beamforming, and a channel in an idle state is determined.

In an exemplary embodiment, the channels which are needed for transmitting data by means of beamforming are transmission channels, arranged at a set transmission angle or a set reception angle and working within a set frequency range, between a transmitting station and a receiving station.

In an exemplary embodiment, the act of performing the channel measurement for the channels which are needed for transmitting data by means of beamforming includes the following act.

Wireless signal sense is performed on each of the channels and received wireless signal strength is measured on each of the channels. The wireless signal strength may be an average value of signal strength in a preset period of time.

In an exemplary embodiment, the act of performing the channel measurement for the channels which are needed for transmitting data by means of beamforming and determining the channel in the idle state includes the following acts.

When beamforming data is transmitted at a fixed power, the channel is determined to be in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the act of performing the channel measurement for the channels which are needed for transmitting data by means of beamforming and determining the channel in the idle state includes the following acts.

When beamforming data is transmitted at a variable power, transmission power of beamforming data satisfying a set modulation coding rate is calculated, and the channel is determined to be in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the method for detecting the idle channel further includes at least one of the following acts.

The threshold A1 and the threshold A2 are reduced when the number of stations on a channel which is needed for transmitting data by means of beamforming is detected to increase.

The threshold A1 and the threshold A2 are increased when the number of stations on a channel which is needed for transmitting data by means of beamforming is detected to decrease.

In an exemplary embodiment, the act of calculating the transmission power of the beamforming data satisfying the set modulation coding rate includes the following acts.

Indication information is acquired from a receiving station. As an exemplary implementation, the indication information includes a transmission power level that the receiving station transmits a radio frame, and a reception power of a radio frame of the receiving station.

The transmission power P_TX2 of the beamforming data satisfying the set modulation coding rate is calculated based on: P_TX2=RX_MCS+P_TX1-P_RX+DELTA; where P_TX2 is the transmission power, RX_MCS is sensitivity corresponding to a specified Modulation Coding Rate Set (MCS), P_TX1 is the transmission power level that the receiving station transmits the radio frame, P_RX is the reception power of the radio frame of the receiving station, and DELTA is a correction factor including an antenna gain and an antenna loss.

In an exemplary embodiment, the method for detecting the idle channel further includes the following acts.

A transmitting opportunity is contended for on the channel in the idle state according to a channel contention access mechanism after determining the channel in the idle state, and data is transmitted after getting the transmitting opportunity.

In an exemplary embodiment, the act of contending for the transmitting opportunity on the channel in the idle state according to the channel contention access mechanism and transmitting data after getting the transmitting opportunity includes one of the following acts.

When there is a plurality of channels in the idle state, the transmitting opportunity is contended for in each of the channels in the idle state according to the channel contention access mechanism and the data is transmitted in a corresponding channel after getting the transmitting opportunity.

When there is a plurality of channels in the idle state, the transmitting opportunity is contended for in one of the channels in the idle state according to the channel contention access mechanism and the data is transmitted in each of the channels in the idle state after getting the transmitting opportunity.

A system for detecting an idle channel is provided, applied in a wireless communication system. The system for detecting the idle channel includes a channel measurement module and an idle channel determining module.

The channel measurement module is arranged to perform channel measurement for channels which are needed for transmitting data by means of beamforming.

The idle channel determining module is arranged to determine, according to a channel measurement result, a channel in an idle state.

In an exemplary embodiment, the channels which are needed for transmitting data by means of beamforming are transmission channels, arranged at a set transmission angle or a set reception angle and working within a set frequency range, between a transmitting station and a receiving station.

In an exemplary embodiment, the channel measurement module is arranged to perform the channel measurement for the channels which are needed for transmitting data by means of beamforming in the following manner.

The channel measurement module is arranged to perform wireless signal sense and measure received wireless signal strength on each of the channels. The wireless signal strength may be an average value of signal strength in a preset period of time.

In an exemplary embodiment, the idle channel determining module is arranged to determine, according to the channel measurement result, the channel in the idle state in the following manner.

The idle channel determining module is arranged to, when beamforming data is transmitted at a fixed power, determine the channel to be in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the idle channel determining module is arranged to determine, according to the channel measurement result, the channel in the idle state in the following manner.

The idle channel determining module is arranged to, when beamforming data is transmitted at a variable power, calculate transmission power of beamforming data satisfying a set modulation coding rate, and determine the channel to be in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the idle channel determining module is further arranged to:

reduce the threshold A1 and the threshold A2 when the number of stations on a channel which is needed for transmitting data by means of beamforming is detected to increase; and/or, increase the threshold A1 and the threshold A2 when the number of stations on a channel which is needed for transmitting data by means of beamforming is detected to decrease.

In an exemplary embodiment, the idle channel determining module is arranged to calculate the transmission power of the beamforming data satisfying the set modulation coding rate in the following manner.

The idle channel determining module is arranged to acquire indication information from a receiving station. The indication information includes a transmission power level that the receiving station transmits a radio frame, and a reception power of a radio frame of the receiving station.

The idle channel determining module is arranged to calculate the transmission power of the beamforming data satisfying the set modulation coding rate based on $P\_TX2 = RX\_MCS + P\_TX1 - P\_RX + DELTA$; where $P\_TX2$ is the transmission power, $RX\_MCS$ is the sensitivity corresponding to the specified MCS, $P\_TX1$ is the transmission power level that the receiving station transmits the radio frame, $P\_RX$ is the reception power of the radio frame of the receiving station, and $DELTA$ is a correction factor including an antenna gain and an antenna loss.

In an exemplary embodiment, the system for detecting the idle channel further includes a data transmission module.

The data transmission module is arranged to contend for a transmitting opportunity on the channel in the idle state according to a channel contention access mechanism after determining the channel in the idle state, and transmit the data after getting the transmitting opportunity.

In an exemplary embodiment, the data transmission module is arranged to contend for the transmitting opportunity on the channel in the idle state according to the channel contention access mechanism and transmit the data after getting the transmitting opportunity in one of the following manners.

The data transmission module is arranged to, when there is a plurality of channels in the idle state, contend for the transmitting opportunity in each of the channels in the idle state according to the channel contention access mechanism and transmit the data in a corresponding channel after getting the transmitting opportunity.

The data transmission module is arranged to, when there is a plurality of channels in the idle state, contend for the transmitting opportunity in one of the channels in the idle state according to the channel contention access mechanism and transmit the data in each of the channels in the idle state after getting the transmitting opportunity.

A computer program is provided, including program instructions, which, when executed by a computer, cause the computer to perform any of the above method for detecting an idle channel.

A carrier is provided, carrying the computer program.

In the above technical solution, when a station transmits data with the beamforming technology, channel measurement is performed for channels which are needed for transmitting data by means of beamforming and a channel in an idle state is determined. It may be appreciated that by using techniques disclosed herein, the data transmission on each channel can be effectively controlled, which not only avoids the collision of data, but also improves the efficiency of data transmission.

DETAILED DESCRIPTION OF THE EMBODIMENTS

The embodiment of the present disclosure is described below with reference to the drawings in detail. It is to be noted that the embodiments of the present application and the characteristics in the embodiments may be combined with each other under the condition of no conflicts.

Figure 1:
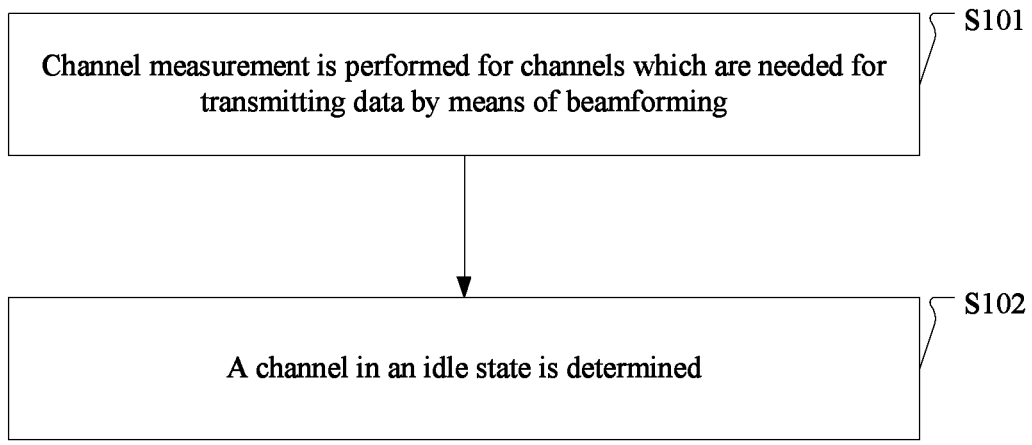
FIG. 1 is a flow diagram of a method for detecting an idle channel according to an embodiment of the present disclosure.

FIG. 1 is a flow diagram of a method for detecting an idle channel according to an embodiment of the present disclosure. The method for detecting the idle channel includes the following acts.

At act S101, channel measurement is performed for channels which are needed for transmitting data by means of beamforming.

The channels which are needed for transmitting data by means of beamforming are transmission channels, arranged at a set transmission angle or a set reception angle and working within a set frequency range, between a transmitting station and a receiving station.

The channel measurement includes performing wireless signal sense and measuring received wireless signal strength on each of the channels. The wireless signal strength may be, e.g., an average value of signal strength in a preset period of time.

In an exemplary embodiment, the act of performing the channel measurement for the channels which are needed for transmitting data by means of beamforming includes at least one of the following acts.

When beamforming data is transmitted at a fixed power, the channel is determined to be in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

When beamforming data is transmitted at a variable power, calculating transmission power of beamforming data satisfying a set modulation coding rate, and the channel is determined to be in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the act of calculating the transmission power of the beamforming data satisfying the set modulation coding rate includes the following acts.

Indication information is acquired from a receiving station. The indication information may include a transmission power level that the receiving station transmits a radio frame, and a reception power of a radio frame of the receiving station.

The transmission power of the beamforming data satisfying the set modulation coding rate is calculated based on $P\_TX2 = RX\_MCS + P\_TX1 - P\_RX + DELTA$; where $P\_TX2$ is the transmission power;

$RX\_MCS$ is the sensitivity corresponding to the specified MCS;

$P\_TX1$ is the transmission power level that the receiving station transmits the radio frame;

$P\_RX$ is the reception power of the radio frame of the receiving station; and $DELTA$ is a correction factor including an antenna gain and an antenna loss.

The above threshold A1 and threshold A2 may be dynamically adjusted according to the transmission bandwidth. As an alternative, the above threshold A1 and threshold A2 may also be adjusted according to the number of stations on the channel. For example, the threshold A1 and the threshold A2 may be reduced when the number of stations on a channel which is needed for transmitting data by means of beamforming is detected to increase; and/or the threshold A1 and the threshold A2 are increased when the number of stations on a channel which is needed for transmitting data by means of beamforming is detected to decrease. By dynamically adjusting the threshold A1 and the threshold A2, it is possible to increase the probability of transmission data when the channel transmission condition is good and decrease the probability of transmission data when the channel transmission condition becomes bad.

At act S102, a channel in an idle state is determined.

In an exemplary embodiment, the method for detecting the idle channel may further include contending for a transmitting opportunity on the channel in the idle state according to the channel contention access mechanism (such as CSMA/CA mechanism) after determining the channel in the idle state, and transmitting data after getting the transmitting opportunity.

In an exemplary embodiment, the act of contending for the transmitting opportunity on the channel in the idle state according to the channel contention access mechanism and transmitting data after getting the transmitting opportunity may be implemented in one of the following manners.

In manner 1, when there is a plurality of channels in the idle state, contending for the transmitting opportunity in each of the channels in the idle state according to the channel contention access mechanism and transmitting the data in a corresponding channel after getting the transmitting opportunity.

In manner 2, when there is a plurality of channels in the idle state, contending for the transmitting opportunity in one of the channels in the idle state according to the channel contention access mechanism and transmitting the data in each of the channels in the idle state after getting the transmitting opportunity. Compared with manner 1, it is more likely that a collision occurs when transmitting data on a channel other than the channel in which the transmitting station contends for the transmitting opportunity, but the complexity is reduced because this manner reduces the operation of contending for the transmitting opportunity on a plurality of channels.

In the above embodiments, when the station transmits data with the beamforming technology, channel measurement is performed for channels which are needed for transmitting data by means of beamforming and a channel in an idle state is determined, so that the data transmission on each channel can be effectively controlled, which not only avoids the collision of data, but also improves the efficiency of data transmission.

The above embodiments will be further described with reference to three specific application examples.

In application example 1, the transmitting station transmits the beamforming data at a fixed power.

The transmitting station performs channel measurement for channels which are needed for transmitting data by means of beamforming, and determines whether the channels are in an idle state. The conditions for determining that a channel is in an idle state include:

1) signal strength detected in an opposite direction of a transmission direction of data to be transmitted is less than or equal to a threshold A1; and 2) signal strength detected in a same direction of the transmission direction of the data to be transmitted is less than or equal to a threshold A2.

When the above conditions 1) and 2) are both satisfied, it can be determined that the channel is in the idle state. The threshold A1 and the threshold A2 may be set according to a transmission bandwidth. Alternatively, the above threshold A1 and threshold A2 may also be adjusted according to the number of stations on the channel. For example, the threshold A1 and the threshold A2 are reduced when the number of stations on a channel which is needed for transmitting data by means of beamforming is detected to increase; and/or the threshold A1 and the threshold A2 are increased when the number of stations on a channel which is needed for transmitting data by means of beamforming is detected to decrease.

The transmitting station contends for a transmitting opportunity on the channel in the idle state according to the channel contention access mechanism (such as CSMA/CA mechanism) after determining the channel in the idle state, and transmits the data after getting the transmitting opportunity.

In application example 2, the transmitting station transmits the beamforming data at a variable power.

The transmitting station performs channel measurement for channels which are needed for transmitting data by means of beamforming, and determines whether the channels are in an idle state. The conditions for determining that a channel is in an idle state include:

1) signal strength detected in an opposite direction of a transmission direction of data to be transmitted is less than or equal to a threshold A1;

2) signal strength detected in a same direction of the transmission direction of the data to be transmitted is less than or equal to a threshold A2; and 3) the transmission power of the beamforming data satisfying the set modulation coding rate is calculated and the transmission power is supported by a current transmitting station.

The transmission power of the beamforming data satisfying the set modulation coding rate is calculated in the following manner.

Indication information is acquired from a receiving station. The indication information includes a transmission power level that the receiving station transmits a radio frame, and a reception power of a radio frame of the receiving station.

The transmission power of the beamforming data satisfying the set modulation coding rate is calculated based on $P\_TX2 = RX\_MCS + P\_TX1 - P\_RX + DELTA$; where $P\_TX2$ is the transmission power;

$RX\_MCS$ is the sensitivity corresponding to the specified MCS;

$P\_TX1$ is the transmission power level that the receiving station transmits the radio frame;

$P\_RX$ is the reception power of the radio frame of the receiving station; and

DELTA is a correction factor including an antenna gain and an antenna loss.

When the above conditions 1), 2) and 3) are all satisfied, it can be determined that the channel is in the idle state. The threshold A1 and the threshold A2 may be set according to a transmission bandwidth. Alternatively, the above threshold A1 and threshold A2 may also be adjusted according to the number of stations on the channel. For example, the threshold A1 and the threshold A2 are reduced when the number of stations on a channel which is needed for transmitting data by means of beamforming is detected to increase; and/or the threshold A1 and the threshold A2 are increased when the number of stations on a channel which is needed for transmitting data by means of beamforming is detected to decrease.

The transmitting station contends for a transmitting opportunity on the channel in the idle state according to the channel contention access mechanism (such as CSMA/CA mechanism) after determining the channel in the idle state, and transmits the data after getting the transmitting opportunity.

In application example 3, the transmitting station transmits the beamforming data at a fixed power.

The transmitting station performs channel measurement for channels which are needed for transmitting data by means of beamforming, and determines whether the channels are in an idle state. The conditions for determining that a channel is in an idle state include:

1) signal strength detected in an opposite direction of a transmission direction of data to be transmitted is less than or equal to a threshold A1; and 2) signal strength detected in a same direction of the transmission direction of the data to be transmitted is less than or equal to a threshold A2.

When the above conditions 1) and 2) are both satisfied, it can be determined that the channel is in the idle state. The threshold A1 and the threshold A2 may be set according to a transmission bandwidth. Alternatively, the above threshold A1 and threshold A2 may also be adjusted according to the number of stations on the channel. For example, the threshold A1 and the threshold A2 are reduced when the number of stations on a channel which is needed for transmitting data by means of beamforming is detected to increase; and/or the threshold A1 and the threshold A2 are increased when the number of stations on a channel which is needed for transmitting data by means of beamforming is detected to decrease.

The transmitting station contends for a transmitting opportunity on the channel in the idle state according to the channel contention access mechanism (such as CSMA/CA mechanism) after determining the channel in the idle state, and transmits the data after getting the transmitting opportunity. When there is a plurality of channels in the idle state, the transmitting station contends for the transmitting opportunity in each of the channels in the idle state according to the channel contention access mechanism and transmits the data in a corresponding channel after getting the transmitting opportunity. Alternatively, the transmitting station contends for the transmitting opportunity in one of the channels in the idle state according to the channel contention access mechanism and transmits the data in each of the channels in the idle state after getting the transmitting opportunity.

Figure 2:
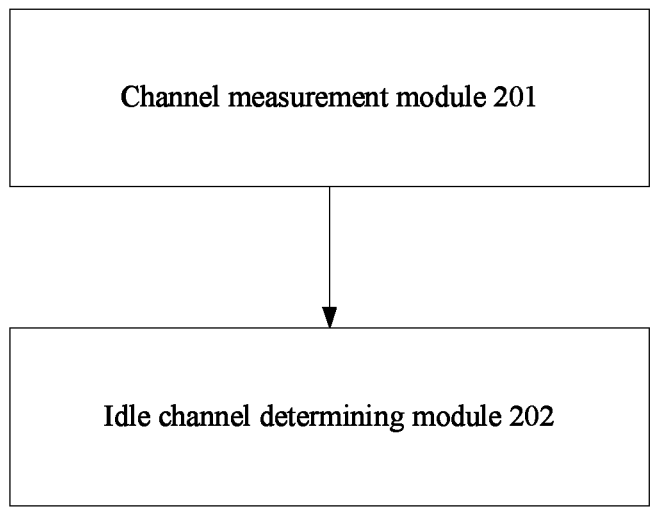
FIG. 2 is a composition diagram of a system for detecting an idle channel according to an embodiment of the present disclosure.

FIG. 2 is a composition diagram of a system for detecting an idle channel according to an embodiment of the present disclosure.

The system for detecting the idle channel includes: a channel measurement module and an idle channel determining module.

The channel measurement module 201 is arranged to perform channel measurement for channels which are needed for transmitting data by means of beamforming.

The channels which are needed for transmitting data by means of beamforming are transmission channels, arranged at a set transmission angle or a set reception angle and working within a set frequency range, between a transmitting station and a receiving station.

In an exemplary embodiment, the channel measurement module 201 is arranged to perform the channel measurement in the following manner.

The channel measurement module 201 is arranged to perform wireless signal sense and measuring received wireless signal strength on each of the channels. The wireless signal strength is an average value of signal strength in a preset period of time.

The idle channel determining module 202 is arranged to determine, according to a channel measurement result, a channel in an idle state.

In an exemplary embodiment, the idle channel determining module 202 is arranged to determine, according to the channel measurement result, the channel in the idle state in at least one of the following manners.

The idle channel determining module 202 is arranged to, when beamforming data is transmitted at a fixed power, determine the channel to be in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

The idle channel determining module 202 is arranged to, when beamforming data is transmitted at a variable power, calculate transmission power of beamforming data satisfying a set modulation coding rate, and determine the channel to be in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2. The threshold A1 and the threshold A2 may be set according to a transmission bandwidth.

In an exemplary embodiment, the idle channel determining module is arranged to calculate the transmission power of the beamforming data satisfying the set modulation coding rate in the following manner.

The idle channel determining module is arranged to acquire indication information from a receiving station. The indication information includes a transmission power level that the receiving station transmits a radio frame, and a reception power of a radio frame of the receiving station.

The idle channel determining module is arranged to calculate the transmission power of the beamforming data satisfying the set modulation coding rate based on $P\_TX2 = RX\_MCS + P\_TX1 - P\_RX + DELTA$; where $P\_TX2$ is the transmission power;

$RX\_MCS$ is the sensitivity corresponding to the specified MCS;

$P\_TX1$ is the transmission power level that the receiving station transmits the radio frame;

$P\_RX$ is the reception power of the radio frame of the receiving station; and

DELTA is a correction factor including an antenna gain and an antenna loss.

The above threshold A1 and threshold A2 may be dynamically adjusted according to a transmission bandwidth. As an alternative, the above threshold A1 and threshold A2 may also be adjusted according to the number of stations on the channel. The idle channel determining module 202 is further arranged to: reduce the threshold A1 and the threshold A2 when the number of stations on a channel which is needed for transmitting data by means of beamforming is detected to increase; and/or increase the threshold A1 and the threshold A2 when the number of stations on a channel which is needed for transmitting data by means of beamforming is detected to decrease. By dynamically adjusting the threshold A1 and the threshold A2, it is possible to increase the probability of transmission data when the channel transmission condition is good and decrease the probability of transmission data when the channel transmission condition becomes bad.

The above system further includes a data transmission module. The data transmission module is arranged to contend for a transmitting opportunity on the channel in the idle state according to the channel contention access mechanism (such as CSMA/CA mechanism) after determining the channel in the idle state, and transmit the data after getting the transmitting opportunity.

In an exemplary embodiment, the data transmission module is arranged to contend for the transmitting opportunity on the channel in the idle state according to the channel contention access mechanism and transmit the data after getting the transmitting opportunity in one of the following manners.

The data transmission module is arranged to, when there is a plurality of channels in the idle state, contend for the transmitting opportunity in each of the channels in the idle state according to the channel contention access mechanism and transmit the data in a corresponding channel after getting the transmitting opportunity.

The data transmission module is arranged to, when there is a plurality of channels in the idle state, contend for the transmitting opportunity in one of the channels in the idle state according to the channel contention access mechanism and transmit the data in each of the channels in the idle state after getting the transmitting opportunity. Compared with mode 1, it is more likely that a collision occurs when transmitting data on a channel other than the channel in which the data transmission module contends for the transmitting opportunity, but the complexity is reduced because the operation of contending for the transmitting opportunity on a plurality of channels can be reduced.

Another embodiment of the present disclosure also discloses a computer program, including program instructions, which, when executed by a computer, cause the computer to perform any of the above method for detecting an idle channel.

Still another embodiment of the present disclosure also discloses a carrier, carrying the computer program.

It will be understood by those of ordinary skill in the art that all or a part of steps in the above method may be accomplished by a program instructing the related hardware, and the program may be stored in a computer readable storage medium, such as a read-only memory, an optical disk or a magnetic disk. Optionally, all or a part of the steps of the above embodiments may also be implemented using one or more integrated circuits. Accordingly, various modules/units in the above embodiments may be implemented in the form of hardware, and may be implemented in the form of software function modules. The present disclosure is not limited to any particular form of combination of hardware and software.

It is to be noted that the present disclosure may be embodied in other various embodiments. Various corresponding changes and modifications may be made by those skilled in the art according to the present disclosure without departing from the principle of the present disclosure, but the corresponding changes and modifications are intended to fall within the scope of protection of the appended claims.

INDUSTRIAL APPLICABILITY

In the above technical solution, when the station transmits data with the beamforming technology, channel measurement is performed for channels which are needed for transmitting data by means of beamforming and a channel in an idle state is determined. By virtue of the technical scheme, the data transmission on each channel can be effectively controlled, which not only avoids the collision of data, but also improves the efficiency of data transmission.

What is claimed is:

1. A method for detecting an idle channel, applied in a wireless communication system, wherein the method for detecting the idle channel comprises:
   performing channel measurement for channels which are needed for transmitting data by means of beamforming, and determining a channel in an idle state;
   wherein performing the channel measurement for the channels which are needed for transmitting data by means of beamforming comprises:
   performing wireless signal sense and measuring received wireless signal strength on each of the channels, wherein the wireless signal strength is an average value of signal strength in a preset period of time;
   wherein performing the channel measurement for the channels which are needed for transmitting data by means of beamforming and determining the channel in the idle state comprises:
   when beamforming data is transmitted at a fixed power, determining that the channel is in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2, wherein the threshold A1 and the threshold A2 are set according to a transmission bandwidth; or
   when beamforming data is transmitted at a variable power, calculating transmission power of beamforming data satisfying a set modulation coding rate, and determining that the channel is in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2, wherein the threshold A1 and the threshold A2 are set according to a transmission bandwidth.

2. The method for detecting the idle channel as claimed in claim 1, wherein
   the channels which are needed for transmitting data by means of beamforming are transmission channels, arranged at a set transmission angle or a set reception angle and working within a set frequency range, between a transmitting station and a receiving station.

3. The method for detecting the idle channel as claimed in claim 1, wherein the method for detecting the idle channel further comprises at least one of:

reducing the threshold A1 and the threshold A2 when the number of stations on a channel which is needed for transmitting data by means of beamforming is detected to increase; or increasing the threshold A1 and the threshold A2 when the number of stations on a channel which is needed for transmitting data by means of beamforming is detected to decrease.

4. The method for detecting the idle channel as claimed in claim 1, when beamforming data is transmitted at a variable power, the step of calculating the transmission power of the beamforming data satisfying the set modulation coding rate comprises:

acquiring indication information from a receiving station, wherein the indication information comprises a transmission power level that the receiving station transmits a radio frame, and a reception power of a radio frame of the receiving station;

calculating the transmission power P_TX2 of the beamforming data satisfying the set modulation coding rate based on: P_TX2=RX_MCS+P_TX1-P_RX+DELTA; where P_TX2 is the transmission power, RX_MCS is sensitivity corresponding to a specified Modulation Coding Rate Set (MCS), P_TX1 is the transmission power level that the receiving station transmits the radio frame, P_RX is the reception power of the radio frame of the receiving station, and DELTA is a correction factor comprising an antenna gain and an antenna loss.

5. The method for detecting the idle channel as claimed in claim 1, wherein the method for detecting the idle channel further comprises:

contending for a transmitting opportunity on the channel in the idle state according to a channel contention access mechanism after determining the channel in the idle state, and transmitting data after getting the transmitting opportunity.

6. The method for detecting the idle channel as claimed in claim 5, wherein contending for the transmitting opportunity on the channel in the idle state according to the channel contention access mechanism and transmitting data after getting the transmitting opportunity comprises one of:

when there is a plurality of channels in the idle state, contending for the transmitting opportunity in each of the channels in the idle state according to the channel contention access mechanism and transmitting the data in a corresponding channel after getting the transmitting opportunity;

when there is a plurality of channels in the idle state, contending for the transmitting opportunity in one of the channels in the idle state according to the channel contention access mechanism and transmitting the data in each of the channels in the idle state after getting the transmitting opportunity.

7. A system for detecting an idle channel, applied in a wireless communication system, wherein the system for detecting the idle channel comprises a hardware processor arranged to execute program modules comprising: a channel measurement module and an idle channel determining module, wherein the channel measurement module is arranged to perform channel measurement for channels which are needed for transmitting data by means of beamforming; and the idle channel determining module is arranged to determine, according to a channel measurement result, a channel in an idle state;

wherein the channel measurement module is arranged to perform the channel measurement for the channels which are needed for transmitting data by means of beamforming in the following manner:

the channel measurement module is arranged to perform wireless signal sense and measuring received wireless signal strength on each of the channels, wherein the wireless signal strength is an average value of signal strength in a preset period of time;

wherein the idle channel determining module is arranged to determine, according to the channel measurement result, the channel in the idle state in the following manner:

the idle channel determining module is arranged to, when beamforming data is transmitted at a fixed power, determine that the channel is in the idle state under a condition that signal strength detected in an opposite direction of a transmission direction of data to be transmitted is less than or equal to a threshold A1 and signal strength detected in a same direction of the transmission direction of the data to be transmitted is less than or equal to a threshold A2, wherein the threshold A1 and the threshold A2 are set according to a transmission bandwidth; or the idle channel determining module is arranged to, when beamforming data is transmitted at a variable power, calculate transmission power of beamforming data satisfying a set modulation coding rate, and determine that the channel is in the idle state under a condition that the transmission power is supported by a current transmitting station, signal strength detected in an opposite direction of a transmission direction of data to be transmitted is less than or equal to a threshold A1 and signal strength detected in a same direction of the transmission direction of the data to be transmitted is less than or equal to a threshold A2, wherein the threshold A1 and the threshold A2 are set according to a transmission bandwidth.

8. The system for detecting the idle channel as claimed in claim 7, wherein the channels which are needed for transmitting data by means of beamforming are transmission channels, arranged at a set transmission angle or a set reception angle and working within a set frequency range, between a transmitting station and a receiving station.

9. The system for detecting the idle channel as claimed in claim 7, wherein the idle channel determining module is further arranged to execute at least one of the following:

reduce the threshold A1 and the threshold A2 when the number of stations on a channel which is needed for transmitting data by means of beamforming is detected to increase;

increase the threshold A1 and the threshold A2 when the number of stations on a channel which is needed for transmitting data by means of beamforming is detected to decrease.

10. The system for detecting the idle channel as claimed in claim 7, when beamforming data is transmitted at a variable power, the idle channel determining module is arranged to calculate the transmission power of the beamforming data satisfying the set modulation coding rate in the following manner:

the idle channel determining module is arranged to acquire indication information from a receiving station, wherein the indication information comprises a transmission power level that the receiving station transmits a radio frame, and a reception power of a radio frame of the receiving station;

the idle channel determining module is arranged to calculate the transmission power of the beamforming data satisfying the set modulation coding rate based on P_TX2=RX_MCS+P_TX1-P_RX+DELTA; where P_TX2 is the transmission power, RX_MCS is sensitivity corresponding to a specified Modulation Coding Rate Set (MCS), P_TX1 is the transmission power level that the receiving station transmits the radio frame, P_RX is the reception power of the radio frame of the receiving station, and DELTA is a correction factor comprising an antenna gain and an antenna loss.

11. The system for detecting the idle channel as claimed in claim 7, wherein the hardware processor is arranged to execute program modules comprising a data transmission module, wherein the data transmission module is arranged to contend for a transmitting opportunity on the channel in the idle state according to a channel contention access mechanism after determining the channel in the idle state, and transmit the data after getting the transmitting opportunity.

12. The system for detecting the idle channel as claimed in claim 11, wherein the data transmission module is arranged to contend for the transmitting opportunity on the channel in the idle state according to the channel contention access mechanism and transmit the data after getting the transmitting opportunity in one of the following manners:

the data transmission module is arranged to, when there is a plurality of channels in the idle state, contend for the transmitting opportunity in each of the channels in the idle state according to the channel contention access mechanism and transmit the data in a corresponding channel after getting the transmitting opportunity;

the data transmission module is arranged to, when there is a plurality of channels in the idle state, contend for the transmitting opportunity in one of the channels in the idle state according to the channel contention access mechanism and transmit the data in each of the channels in the idle state after getting the transmitting opportunity.

* * * * *